(12) United States Patent
Gorton et al.

(10) Patent No.: US 9,831,641 B2
(45) Date of Patent: Nov. 28, 2017

(54) VARIABLE ION GENERATION AND DELIVERY

(71) Applicant: G-Ro Technologies, LLC, Argyle, TX (US)

(72) Inventors: Stephen Gorton, Rowlett, TX (US); Frank J Brown, Argyle, TX (US)

(73) Assignee: G-RO TECHNOLOGIES, LLC, Argyle, TX (US)

( * ) Notice: Subject to any disclaimer, the term of this patent is extended or adjusted under 35 U.S.C. 154(b) by 101 days.

(21) Appl. No.: 14/216,555

(22) Filed: Mar. 17, 2014

(65) Prior Publication Data

US 2014/0259907 A1   Sep. 18, 2014

Related U.S. Application Data

(60) Provisional application No. 61/792,476, filed on Mar. 15, 2013.

(51) Int. Cl.
| | |
|---|---|
| *C05D 9/00* | (2006.01) |
| *H01T 23/00* | (2006.01) |
| *A01C 23/00* | (2006.01) |
| *A01G 9/10* | (2006.01) |

(Continued)

(52) U.S. Cl.
CPC .............. *H01T 23/00* (2013.01); *A01C 23/00* (2013.01); *A01C 23/04* (2013.01); *A01G 7/06* (2013.01); *A01G 9/1086* (2013.01); *C05D 9/00* (2013.01)

(58) Field of Classification Search
CPC .......... A01G 7/00; A01G 9/00; A01G 9/1086; A01G 7/06; A01C 23/04; A01C 23/00; B01F 3/04; C01B 33/44; C02F 1/4691; C25B 15/02; H01T 23/00; C05D 9/00

USPC .............. 47/58.1 SC; 111/200, 900, 915; 422/256; 204/232, 450, 600, 660, 661, 204/663, 666, 672, 673
See application file for complete search history.

(56) References Cited

U.S. PATENT DOCUMENTS

| | | | | |
|---|---|---|---|---|
| 2,036,949 A | * | 4/1936 | Meinzer ................. | C25B 11/04 204/230.5 |
| 3,508,089 A | * | 4/1970 | Cheshire .................. | H01G 9/21 136/202 |

(Continued)

FOREIGN PATENT DOCUMENTS

BR    WO 2011017788 A1  *  2/2011  ............. A01C 21/00

OTHER PUBLICATIONS

Becamel "International Preliminary Report on Patentability" for PCT Application No. PCT/US2014/030580, dated Sep. 15, 2015, 9 pages.

*Primary Examiner* — Joshua Hudson
*Assistant Examiner* — Ebony Evans
(74) *Attorney, Agent, or Firm* — Kunzler Law Group

(57) ABSTRACT

Embodiments of a system and method are described. In one embodiment, the system generates ions for use in treating vegetation to optimize growth of the vegetation. The system includes an ion generation region having a pair of dissimilar metal plates. The ion generation chamber receives a liquid and routes the liquid past the dissimilar metal plates to capture ion transfer between the dissimilar metal plates. The ions form a charged solution. The system also includes a collection region having a collection bed for storing the charged solution, and a fertigation region for dispersing the liquid. Other embodiments of the system are also described.

18 Claims, 13 Drawing Sheets

(51) Int. Cl.
*A01C 23/04* (2006.01)
*A01G 7/06* (2006.01)

(56) References Cited

U.S. PATENT DOCUMENTS

| | | | | |
|---|---|---|---|---|
| 4,297,123 A * | 10/1981 | Wyse | ............... | C05C 5/04 |
| | | | | 204/179 |
| 4,525,253 A * | 6/1985 | Hayes | ............... | C02F 1/4606 |
| | | | | 204/229.2 |
| 4,687,561 A * | 8/1987 | Kunz | ............... | B01J 47/08 |
| | | | | 204/524 |
| 4,915,915 A * | 4/1990 | Treharne | ............... | B01J 19/088 |
| | | | | 204/178 |
| 5,100,630 A * | 3/1992 | Treharne | ............... | B01J 19/088 |
| | | | | 204/179 |
| 5,357,202 A * | 10/1994 | Henderson | ............... | G01M 3/16 |
| | | | | 324/357 |
| 5,894,696 A * | 4/1999 | Ando | ............... | A01G 7/02 |
| | | | | 204/230.5 |
| 6,309,532 B1 * | 10/2001 | Tran | ............... | B01J 47/08 |
| | | | | 204/267 |
| 6,324,922 B1 | 12/2001 | Hanks | | |
| 7,546,181 B2 * | 6/2009 | Vidovich | ............... | A01G 25/167 |
| | | | | 324/696 |
| 8,920,622 B2 * | 12/2014 | DePaoli | ............... | C25B 15/02 |
| | | | | 204/450 |
| 9,061,323 B2 * | 6/2015 | Field | ............... | A47L 11/4083 |
| 2002/0040855 A1 * | 4/2002 | Morkovsky | ............... | C02F 1/463 |
| | | | | 205/742 |
| 2005/0047091 A1 * | 3/2005 | Minamitani | ............... | G06F 1/203 |
| | | | | 361/702 |
| 2005/0103723 A1 * | 5/2005 | Wilkins | ............... | B01D 61/44 |
| | | | | 204/524 |
| 2006/0049105 A1 * | 3/2006 | Max | ............... | B01D 57/02 |
| | | | | 210/650 |
| 2006/0254929 A1 * | 11/2006 | Mikio | ............... | C02F 1/46176 |
| | | | | 205/742 |
| 2008/0198531 A1 * | 8/2008 | Shiue | ............... | C02F 1/46104 |
| | | | | 361/434 |
| 2010/0147700 A1 * | 6/2010 | Field | ............... | A47L 11/4083 |
| | | | | 205/687 |
| 2010/0206761 A1 | 8/2010 | Bubat et al. | | |
| 2012/0199486 A1 * | 8/2012 | Kang | ............... | C02F 1/46109 |
| | | | | 204/630 |
| 2013/0015071 A1 * | 1/2013 | Willis | ............... | B01D 71/80 |
| | | | | 204/631 |
| 2013/0153426 A1 * | 6/2013 | Sun | ............... | C02F 1/4691 |
| | | | | 204/638 |
| 2013/0277305 A1 * | 10/2013 | Stetson, Jr. | ............... | B01D 65/02 |
| | | | | 210/636 |
| 2014/0202880 A1 * | 7/2014 | Suss | ............... | B03C 9/00 |
| | | | | 205/758 |
| 2014/0339099 A1 * | 11/2014 | Van Der Wal | ............... | C02F 1/4691 |
| | | | | 205/742 |
| 2015/0027890 A1 * | 1/2015 | Jha | ............... | B01J 39/043 |
| | | | | 204/520 |

* cited by examiner

VARIABLE ION GENERATION AND DELIVERY

CROSS-REFERENCE TO RELATED APPLICATIONS

This application claims the benefit of U.S. Provisional Application No. 61/792,476, filed on Mar. 15, 2013, which is incorporated by reference herein in its entirety.

BACKGROUND

Irrigation is a common practice in areas where rainfall is not sufficient to maintain the vegetation. Above ground water source from rivers, streams, lakes, and other bodies of water and from subsurface water sources such as wells and aquifers are often diverted into irrigation systems. However, as the population grows, so do the water needs of the population. Especially in areas that are prone to drought, the amount of water needed to maintain and grow vegetation will continue to increase.

SUMMARY

Embodiments of a system and method are described. In one embodiment, the system generates ions for use in treating vegetation to optimize growth of the vegetation. The system includes an ion generation region having a pair of dissimilar metal plates. The ion generation chamber receives a liquid and routes the liquid past the dissimilar metal plates to capture ion transfer between the dissimilar metal plates. The ions form a charged solution. The system also includes a collection region having a collection bed for storing the charged solution, and a fertigation region for dispersing the liquid. One notable advantage of this technology is that the solution produced by the system holds an ionic charge when generated in the system; and that the liquid solution continues to hold an ionic charge when injected into a water delivery system, and holds an ionic charge in the soil. Other embodiments of the system are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
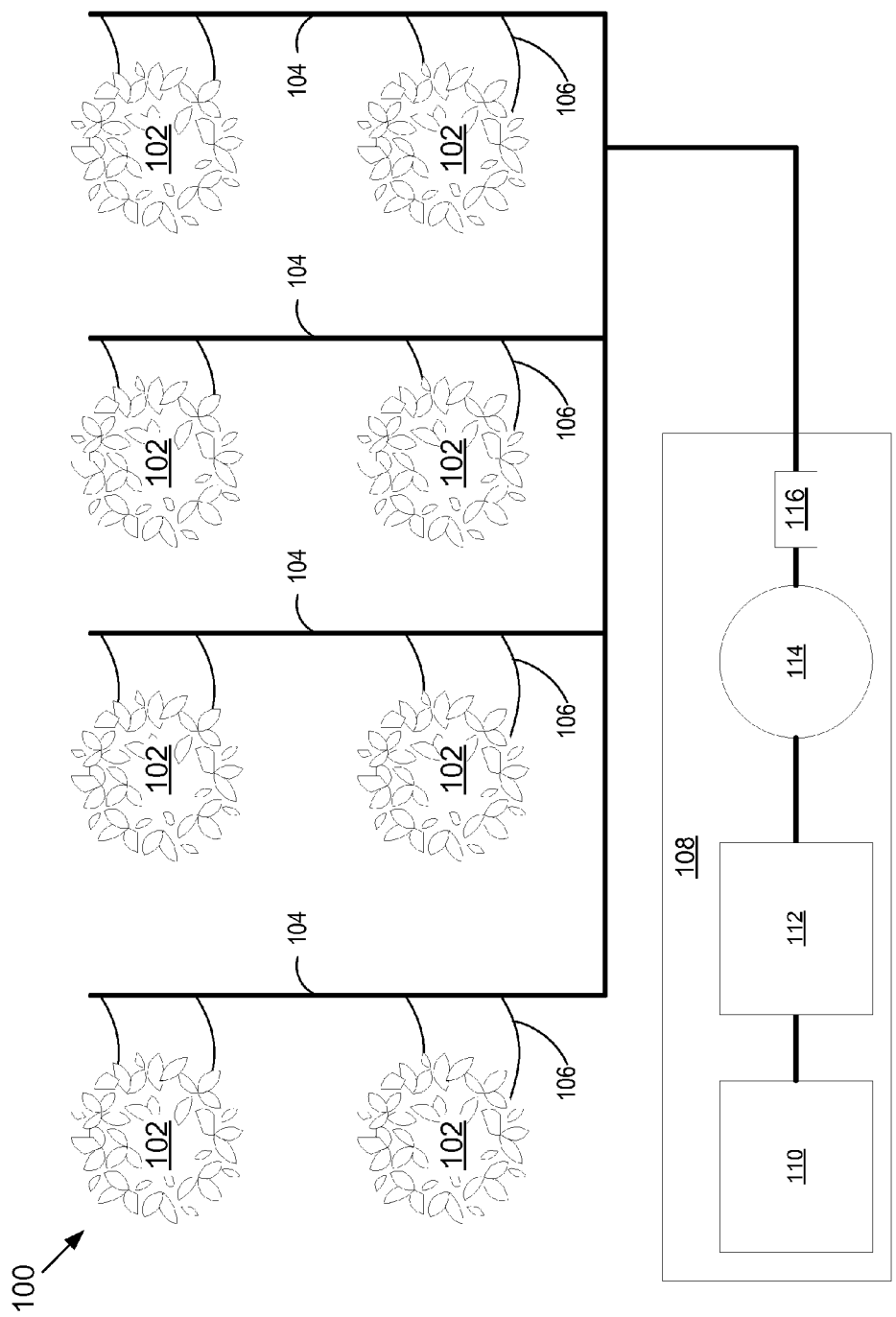
FIG. 1 is a schematic diagram illustrating one embodiment of a system for irrigating vegetation.

Systems and methods for producing, delivering, and storing a charged solution near vegetation (e.g., plant, tree, grass, turf, etc.) are disclosed herein. It will be apparent, however, to one of ordinary skill in the art having the benefit of this disclosure, that embodiments of the present invention may be practiced without these specific details. Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to optimizing vegetation growth. In general, the invention employs charged ionic liquids, or solutions to improve and sustain the growth of plants, trees, grasses, etc. In addition to sustaining plant growth, this technology produces a "charged solution" that when applied to soils changes and remediates soils, in particular by neutralizing the soil pH, reducing the salt absorption ratio ("SAR"), and by leveling off and balancing the cation:anion ratio in soils, all of which improve soil conditions and improve the remediation of soils treated with the charged solution.

FIG. 1 is a schematic diagram illustrating one embodiment of a system 100 for irrigating vegetation (e.g., plant, tree, grass, turf, etc.). It is to be understood that while the description below may reference one type of plant, or vegetation, many other types of trees or plants may be substituted and grown using the systems and methods described. In other words, the term "plant" may be substituted with "tree," "grass," "turf," etc., or vice versa, throughout this disclosure.

The system 100, as depicted, includes a group of trees 102 arranged in rows. Although the trees 102 are depicted as arranged in a grouping of rows, any arrangement of trees may be implemented. Irrigation pipes 104 extend down the rows of trees 102 to deliver a liquid to the trees 102. Drip lines 106 may extend from the irrigation pipes 104 to an area near the base of the trees 102. Coupled to the irrigation pipes 104 is an ion deliver system 108, which generates and stores a charged solution. The ion delivery system 108, in one embodiment, includes an ion generation chamber 110, a collection chamber 112, and a fertigation delivery tank 114. The ion delivery system may also include a reference cell 116. The ion delivery system 108 will be discussed in greater detail below with reference to FIGS. 2-4. In alternative embodiments, the charged solution may be delivered via a vehicle carrying a tank of the charged solution.

The ion delivery system 108 may, in one embodiment, be coupled to irrigation pipes 104 that are connected to sprinklers instead of drip lines. Alternatively, the irrigation pipes 104 may be positioned to flood irrigate the tree or plant growing region.

The controlled, variable ion generation, collection, and delivery system 100 includes a series of connected, integrated equipment and logic. The system 100 may include, in one embodiment, a series of the reference cells 116. The reference cells 116 are, for example, "solenoids" which may be directed to turn flow rates of liquids in the irrigation pipe 104 off and on based on growing factors, which may include, but are not limited to, a conductivity level in the liquid (ohms), resistance levels in the liquid (ohms), pH levels in the liquid, or salinity levels and cation anion ratios in the soil.

Chemicals added to the liquid and delivered to the soils promote the growth of trees or plants. In one embodiment, examples of chemicals that promote the growth of plants include, but are not limited to, manganese or magnesium. Both manganese and magnesium promote chlorophyll production in plants. The charged solution may include electrons from at least one transition metal such as iron, copper, magnesium, manganese, zinc, aluminum, lithium or other dissimilar metals together with an electrolyte and/or a weak acid.

In addition, phosphorus, potassium, nitrogen or a combination thereof may be added to the charged solution in the fertigation tank or added in the ion collection tank. The chemical electrolytes or weak acid in combination with the metal ions in the charged solution speed up remediation of chemical contamination in soils such as excessive hydrocarbons and other pollutants by dropping the SAR levels and by balancing the cation anion ratios in the soils. This allows for a non-ionic (i.e., surfactant containing no electro chemical charge) wetting agent to be added. An example of a non ionic wetting agent/surfactant is Nonylphenolethyoxylated surfactant, NP9, polysorbate 20, polysorbate 40, polysorbate 80 and other nonionic surfactants.

The charged solution may be an enriched effluent, chemical or an acid or a base. The system, in one example, may deliver a weak acid (pH between 4.0-6.8) to the soil to drop the soil pH from a base (pH 8.0-9.5) to neutral range of 7.0 to 7.5. Additionally, an electrolyte solution having a pH of 7.5 to 9.5 may be applied to soils to raise the pH of acidic soil (5.5 to 6.0 pH) to a more neutral range (6.3 to 7.5). The effluent, in one embodiment, is an enriched solution used to treat soils to grow foods, plants, trees, or is used to remediate soils by neutralizing soil pH (6.0 to 8.0) and providing the soil with a specified conductivity in the range of between about 5 and 250 ohms. In a further embodiment, a desired conductivity is in the range of between about 5 ohms and 100 ohms. The conductivity optimization varies between plant types and soil types and soil condition. The solution can be adjusted accordingly to achieve a desired result.

The range of conductivity, described above, varies depending upon the type of vegetation and corresponds to an optimum range for promoting optimal growth. In one embodiment, a reference cell 116 which is in-line to the irrigation water system controls the upper limit and lower limits, turning the liquid delivery system on or off. Alternatively, the ohms measured in the soil may be adjusted manually by spraying charged solution directly to the soil.

Plants and trees grow under optimal conditions using low to mid low (slightly elevated) levels of conductivity in soils, most commonly from charged rain water in the atmosphere. Low levels of conductivity allow an electron transfer to occur in soils, moving nutrients and water to the tree or plant. Beneficially, the embodiments of the present disclosure maintain conductivity in the soils at an optimum growing level, allowing contaminated soils to be remediated faster and more efficiently by providing a conduction level, via the charged solution, which increases oxygen, hydrogen and nitrogen levels in the soil and increases their delivery by reducing the natural electrical resistance in soils. In contaminated soils (i.e., defined as soils containing a chemical contaminant such as hydrocarbons, soils containing high levels of salinity (SAR), or in soils where the cation anion ratios are out of balance) the charged solution increases the contact between a decontamination agent (i.e., biologicals, chemicals, oxygen, hydrogen, nitrogen, carbon, C|H|O|N) and a contaminant (i.e., hydrocarbons, excessive salinity, synthetic chemicals). The increased contact between the charged solution and the contaminant is due to the drop in resistance in the soil and the charge of the charged solution. An opposite charged solution may be used in making the charged solution, which is opposite of the chemical charge of the contaminant. The opposite charges attract and increase contact between the charged solution and the contaminant, or between the charged solution and the root of a plant.

Figure 2:
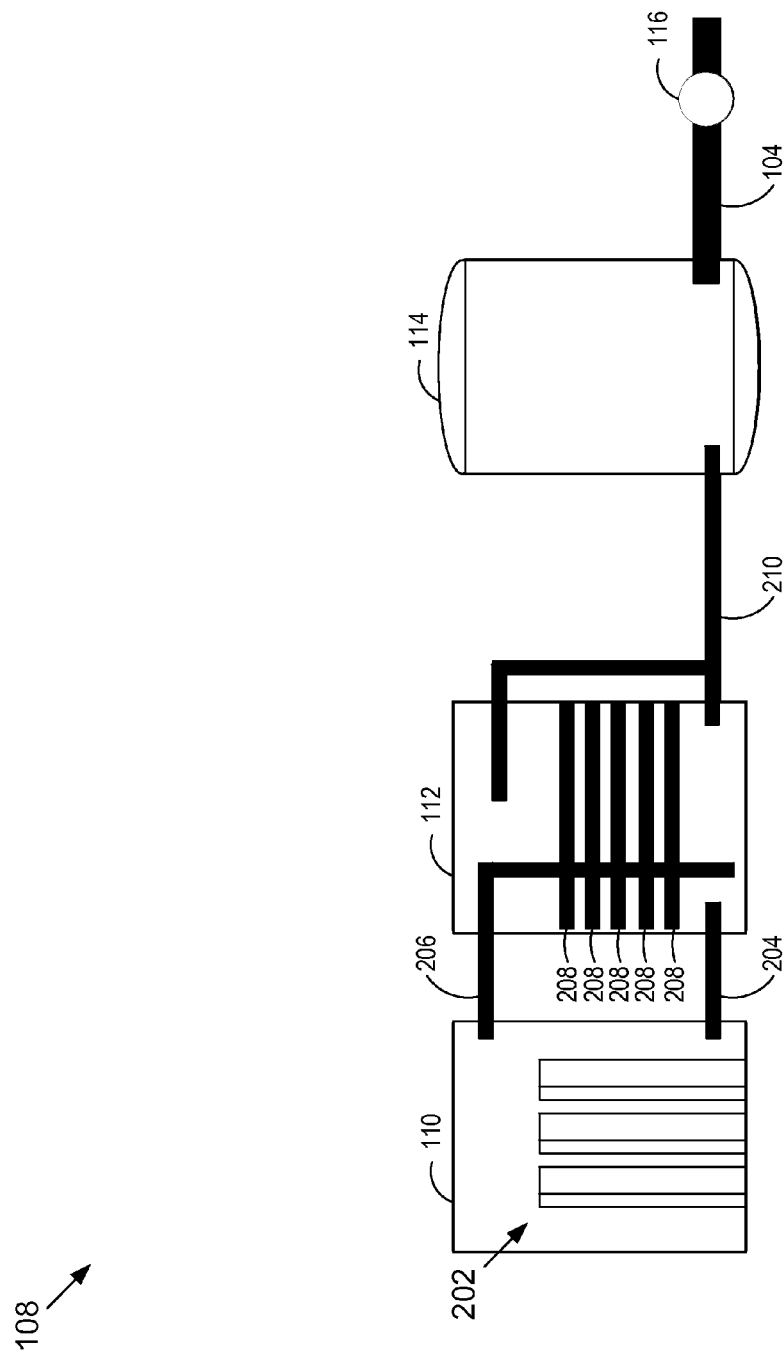
FIG. 2 is a schematic block diagram illustrating one embodiment of the ion delivery system in accordance with embodiments of the present invention.

FIG. 2 is a schematic block diagram illustrating one embodiment of the ion delivery system 108 in accordance with embodiments of the present invention. As stated above, the delivery system 108 includes the ion generation chamber 110, the collection chamber 112, the fertigation tank 114, and the reference cell 116. The ion generation chamber 110 is a tank capable of holding a liquid and the generation of a charged ion. The liquid, in one embodiment, is a water, acid, or electrolyte for promoting increased conductivity and ionization around the base of a tree 102. In another embodiment, the ion generation chamber 110 and the collection chamber 112 may be combined into a single tank for storage and generation of the charged solution. In this example, the second collection tank 112 and the fertigation tank 114 are optional. As will be described below with reference to FIGS. 10-14, ion generation tank acts also as the ion collection tank and the charged solution is discharged directly into the irrigation line. In other applications, the charged solution made by the system may be applied manually or applied to the soil by a tractor with a spray system, for example.

The ion generation chamber 110, in one embodiment, generates free elections from an anode|cathode reaction that results from a series of metal plates 202 disposed within the ion generation chamber 110. The metal plates 202, in one example, are formed of dissimilar metals that may be fused together. Examples of dissimilar metals include, but are not limited to, copper and zinc, copper and iron, copper and aluminum, copper and manganese, copper and manganese with steel, etc. The metal plates 202 will be discussed in greater detail below with reference to FIGS. 3 and 4.

The metal plates 202 generate ions in a liquid in the ion generation chamber 110 by utilizing galvanic conduction or a galvanic reaction created by the direct contact, in one embodiment, of the two dissimilar metals. In an alternative embodiment, the plates are not in direct contact, but are instead separated by a small gap. The gap may have a distance of between about ⅓₂, ⅛$^{th}$, ¼ or ½ of an inch. By adjusting the distance of the gap between the plates, the voltage potential increases or decreases and subsequently the ion transfer increases or decreases accordingly. "Free" metal ions accumulated in the liquid through this "corrosion" process are combined with a polymer to hold a charge in the weak acid or weak electrolyte.

Water, or water and acid, may be forced between the plates 202 by hydro mixing and aeration "pumping" and cycling the effluent in the tank. In other words, the liquid may be pumped from the tank through an aerator or through an air injection device. Alternatively, compressed air may be used to mix or bubble the liquid through the plates. The aerated solution recycled back into the tank or via compressed air introduces, from the atmosphere, nitrogen, hydrogen, oxygen, and carbon which then are bubbled past the plates 202. The hydrogen gas produced in this reaction also creates a current and movement of the solution inside of the tank and causes the tank to become pressurized. The resulting charged solution may be pumped into the collection chamber 112 via a passageway 204. Hydrogen gas is generated by the physical and chemical reaction between the weak acid or electrolyte and the metal plates 202. Hydrogen, nitrogen, and oxygen that are not absorbed into the liquid may be pumped into the collection chamber 112 via a gas passageway 206. A controllable valve (not shown) may be disposed on both passageways 204, 206 for controlling the flow of the liquid or the gas. Hydrogen gas produced by the chemical and metal reaction in the ion chamber causes the tank to become pressurized. Tank pressure is managed by a pressure relief valve and or by the valve located on the output or outflow line of the tank.

The collection chamber 112 includes, in one embodiment, layers of collection beds 208. The collection beds 208 are formed of a polymer-based material and are configured to capture, in an ionic form or in a 'free metal form", nitrogen, oxygen, and hydrogen. The collection beds 208 may be formed of any polymer capable of holding the ions including, but not limited to, silicone, polymer, silica, poly acrylamide, potassium acrylates, etc. In one embodiment, the collection beds 208 are formed of a polyacrylamide polymer with embedded silica. One example of a polyacrylamide suitable for use in accordance with the present disclosure is FloGuard by PPG of Pittsburgh, Pa. Other polymer and silica materials may include at least one of the following: poly-potassium acrylates, potassium meta silicate, or acrylic polymer. A wetting agent may be used in the presence of the polymer. Examples of a wetting agent include, but are not limited to nonylphenolethyoxylated surfactant, polysorbate 20, polysorbate 40, polysorbate 60, or polysorbate 80.

The gas passageway 206 transfers the hydrogen gas generated from the galvanic reaction; plus atmospheric gasses from top of the ion generation chamber 110, above a water level of the ion generation chamber cell 110, to the bottom of the collection chamber 112. The gasses (hydrogen, nitrogen, oxygen, etc.) mix in the collection chamber and rise through the liquid and are captured by the collection beds 208. At least some of the ions join to form variations of a soil amendment or fertilizing agent (e.g., NH, including NH2, a form of urea which may be used as a fertilizer for the trees of FIG. 1). The metal ions such as manganese, iron, copper, aluminum, zinc magnesium are captured in the polymer collection bed.

Following a period of ion generation, the controllable valves may be closed and a pressure gradient applied to the liquid of the collection chamber 112 to release the NH2 from the collection beds to the fertigation tank 114 via a passageway 210. The passageway 210 may also include a controllable valve (not shown) for controlling the flow of the liquid to the fertigation tank 114. Tank pressure in tank 110 and in tank 112 may be controlled by either a pressure release valve or by a controllable valve. The controllable valve transfers hydrogen to the collection bed chamber 112, or is off-gasses the hydrogen when tank pressure rises above a threshold pressure (i.e., >4 psi to 80 psi). Tank pressure may be controlled by a set pressure relief "release" valve or by a discharge valve located on the discharge (outflow) line.

The fertigation tank 114 is a storage container coupled with a pump for delivering the liquid into the irrigation lines 104. The reference cell 116 functions as a controllable valve or solenoid for metering the liquid into the irrigation system. A controller in communication with each of the controllable valves or reference cells will be discussed in greater detail below with reference to FIG. 6. In another embodiment, the collection tank 112 may act as the fertigation tank 114. In other words, the charged solution may be distributed directly from the collection tank to the irrigation system.

Figure 3:
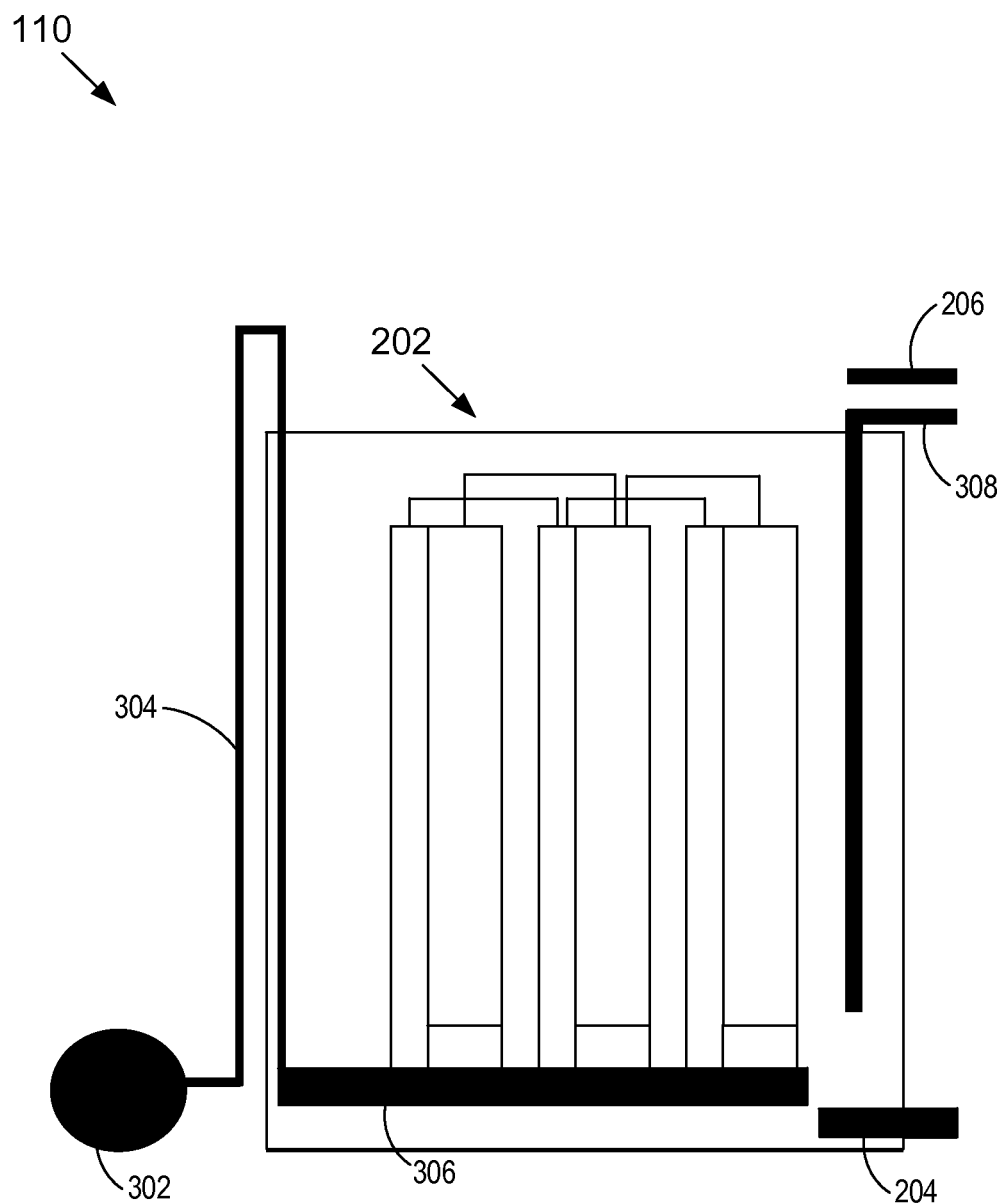
FIG. 3 is a schematic block diagram illustrating another embodiment of the ion generation chamber in accordance with embodiments of the present invention.

FIG. 3 is a schematic block diagram illustrating another embodiment of the ion generation chamber 110 in accordance with embodiments of the present disclosure. The ion generation chamber 110 includes, in the depicted embodiment, banks of metal plates 202. The metal plates' ability to generate voltage or amperage potential, and to store this ionic potential until use, is variable or expandable based on the number of metal banks used in the ion generation chamber 110 and by the pH concentration (hydrogen+ concentration) of the weak acid (H+) or weak electrolyte (OH−) of the liquid.

The ability to generate voltage or amperage potential may also be based on how the metal plates 202 are configured (e.g., closeness or proximity of plates, type of dissimilar metals, etc). In other words, the metal plates 202 may be connected in either parallel or in series. In another use, the metal plates are placed in close proximity and are not connected. For example, the cathodes may all be connected, and the anodes may all be connected in parallel as depicted, or alternatively, the anodes and cathodes may be connected in series. In one example using manganese, the acid or electrolyte conducts voltage between the plates and the stronger metal will pull metal ions off of the manganese plate or carbon steel plate. The voltage and amperage potential may also be increased or decreased based on the types of dissimilar metals used, the number of "banks," the surface area of the banks, the flow of compressed air or water through the bank, or by forced air as used in air injection in combination with recycling the charged fluid in the tank which is pumped thru a fluid nozzle type system, etc. The arrangement of the metal plates 202 will be discussed in greater detail below with reference to FIG. 4.

The ion generation chamber 110, in one embodiment, includes an air compressor 302 fluidly coupled with a compressed air line 304 that is disposed between the air compressor 304 and a base 306 of the metal plates 202. The base 306 of the metal plates acts as an air diffuser for delivery the compressed air into channels formed in the surfaces of the metal plates 202 (see FIG. 4). The air compressor 302 may operate at a pressure in the range of between about 5 and 100 psi. In another embodiment, the air compressor 302 may operate at a pressure in the range of between about 5 and 80 psi.

The ion generation chamber 110, as described above with reference to FIG. 2, includes passageways 204, 206 for the transfer of fluid and gas, respectively, to the collection chamber. In another embodiment, a gas return line 308 fluidly couples the top of the collection chamber 112 with a region near the bottom of the ion generation chamber 110 to return gas that is not captured in the collection beds to the ion generation chamber 110. A controllable valve may also control the gas return line 308.

Figure 4A:
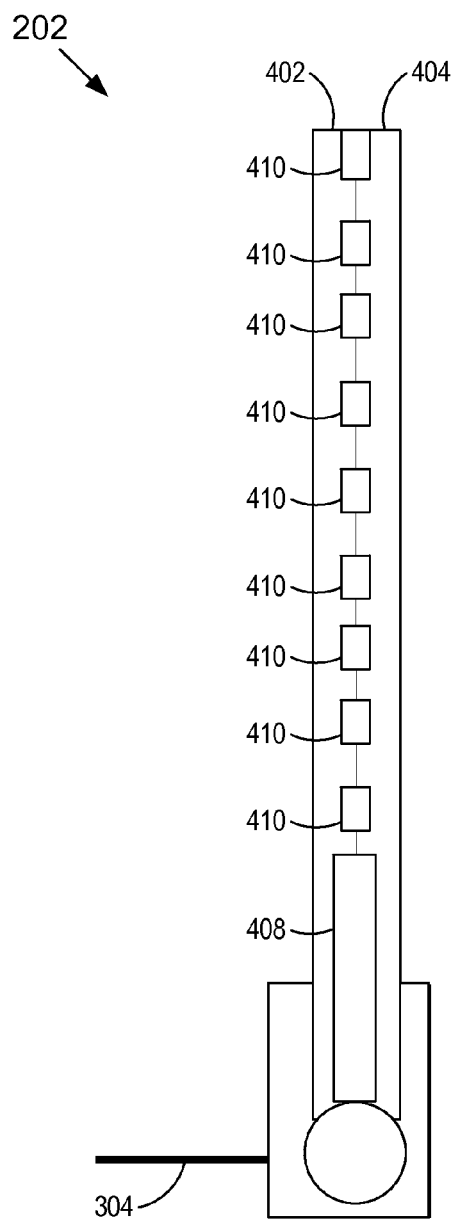
FIGS. 4a and 4b are schematic diagrams illustrating embodiments of the metal plates in accordance with embodiments of the present invention.
Figure 4B:
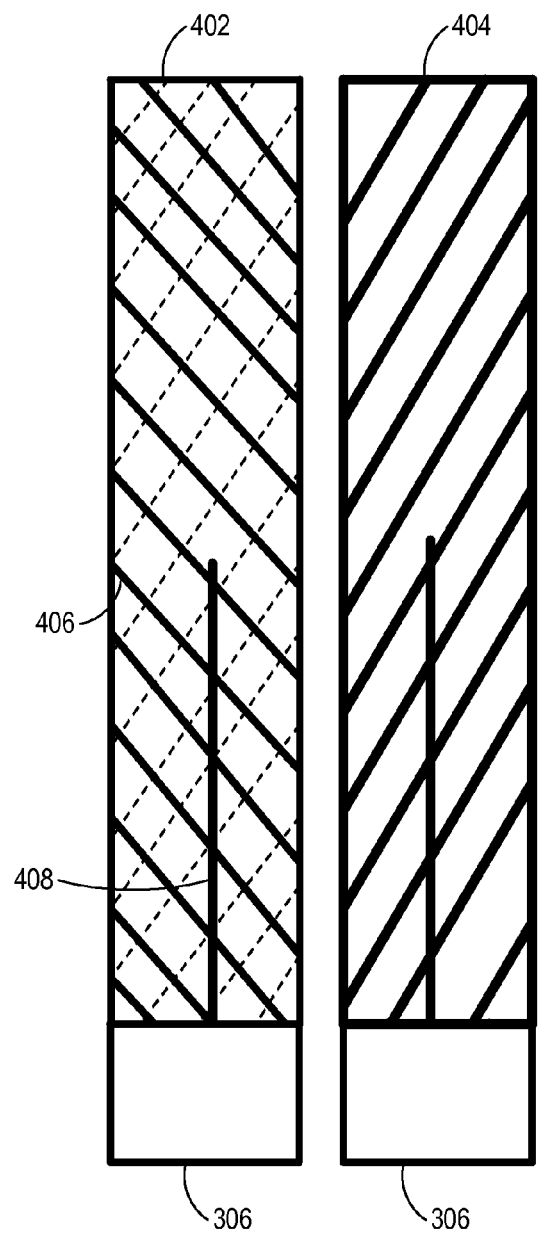

FIGS. 4a and 4b are schematic diagrams illustrating embodiments of the metal plates 202 in accordance with embodiments of the present disclosure. The metal plates, in the depicted embodiment are formed of dissimilar metals. A first plate 402 may be formed of copper. A second plate 404 may be formed of one of manganese, iron, zinc, steel, aluminum, lithium, or other dissimilar metals. Other metals known to cause galvanic reactions may be used in place of the copper, iron, zinc, steel, aluminum, or lithium. Dissimilar metals and alloys have different electrode potentials and when two or more come into contact in an electrolyte, one metal acts as an anode and the other as a cathode. The potential difference between the dissimilar metals is the driving force for the ion migration between the plates. In one embodiment, the metal plates are a mesh plate, or grill having a pattern as depicted in FIG. 4b. The mesh or gill plates increase the surface area of exposed metal and therefore increase the ability of the metal plates to release ions into the liquid. As an alternative to formed plates, shaped plates, mesh, or plates with holes, a solid flat plate may be used as a substitute.

Grooves or channels formed in the surfaces of the plates 402 (FIG. 4a), 404 allow air and liquid to pass between the plates and capture the ion transfer, essentially absorbing the ions into the liquid (water or water/acid) for transfer to the collection chamber 112. The grooves 406 may be formed or positioned diagonally in a diamond pattern on the surface of the plates. 402, 404. The pattern of the first plate 402 may correspond with the pattern of the second plate 404 such that when the first plate 402 is placed in contact with the second plate 404 the grooves line up to form channels through which liquid and air may pass. In another embodiment, the grooves of one plate do not line up with the grooves of the opposing plate. In this situation, channels are still formed by the grooves of one plate with a flat surface of the other plate.

A vertical channel 408 may extend from the base 306 and intersects the grooves 406 at multiple intersections to distribute the air into the plates 402, 404. Although a single vertical channel 408 is depicted, it is to be understood that multiple vertical channels may be formed. In another embodiment, openings in the base 306 correspond with openings in the bottom of the plates formed by the grooves 406 such that air from the base 306 enters directly into the grooves 406. The grooves 406 may have a width and/or depth of approximately ⅛".

The plates 402, 404 may have a thickness of about ¼". The grooved facing of each metal plate forms, in one embodiment, 90 degree angles when placed face to face. The dissimilar metal plates are fixed in contact with each other. In one embodiment, the plates 402, 404 are welded together. In another embodiment the plates are secured with fasteners.

Multiple sets of dissimilar plates may be secured in the ion generation chamber 110. The size or surface area of the plates determines the voltage potential and amperage when linked in series or parallel. FIG. 4a also shows a cross-section of the plates 402, 404 and the channels 410 formed by the grooves 406. The base 306 may be releasably coupled to the plates 402, 404 such that the plates 402, 404 may be replaced.

Figure 5:
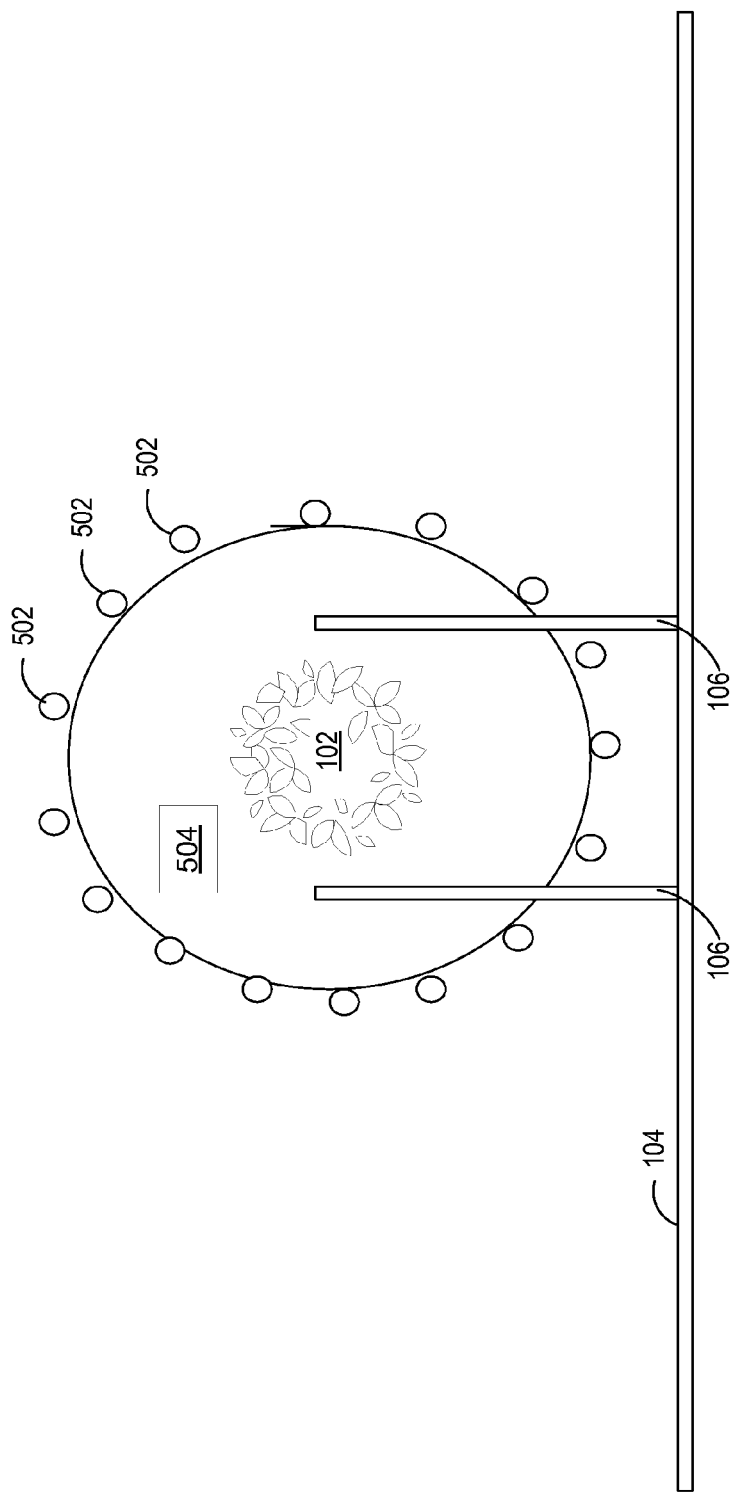
FIG. 5 is a schematic block diagram illustrating one embodiment of an irrigation arrangement for delivering the ionic liquid to the tree.

FIG. 5 is a schematic block diagram illustrating one embodiment of an irrigation arrangement for delivering the ionic liquid to the tree 102. The irrigation line 104 delivers the charged solution to the drip lines 106. In another embodiment, the irrigation line 104 is coupled to a series of sprinklers, or alternatively, to open pipe ends to flood irrigate the field the trees are in. Positioned radially around the tree 102 are holes 502 for receiving polymer aggregate. The polymer aggregate is similar in structure to the collection beds of FIG. 2, and are configured to maintain the fertilizer (NH2) generated by the ion generation chamber and the collection chamber. The polymer aggregate may be a linear or cross-linked polymer including, but not limited to, silica, carbon ash, precipitated silicone dioxide, and silicone aggregate.

The holes 502 may be positioned radially around the tree 102 at a radial distance of 3 to 5 feet. The holes 502 may be positioned about 8 to 16 inches apart (measured along the perimeter of a circle formed by the radially positioned holes 502), and in one embodiment are positioned about 12 inches apart from an adjacent hole. Each hole may have a diameter of about one inch or larger. Alternatively, holes may be in free form or, a pvc tube containing the polymer aggregate of approximately 1" may be placed in the hole.

The drip lines 106 may be located on both sides of the tree 102 and positioned in between the tree 102 and the holes 502. The drip lines 106 may be buried in the soil at a depth of between about 3 to 6 inches. In agricultural uses, the irrigation line 104 sends water and specified nutrients and electrons to specified locations at each drip line through subsurface irrigation. Subsurface irrigation is beneficial in that it eliminates or reduces above surface and surface volatilization into the atmosphere, evaporation loss, and increases contact with the soil in the oxygen layer of the soil. The oxygen layer of the soil is the top 6 inches of soil closest to the atmosphere.

In one embodiment, a sensor 504 is positioned near a tree 102. The sensor 504 is in communication with the controller (see FIG. 6). The sensor 504 in one embodiment may be a part of a reference cell that is disposed on the irrigation line 104, or alternatively, a separate module for measuring growth factors as will be discussed below with reference to FIG. 6.

Figure 6:
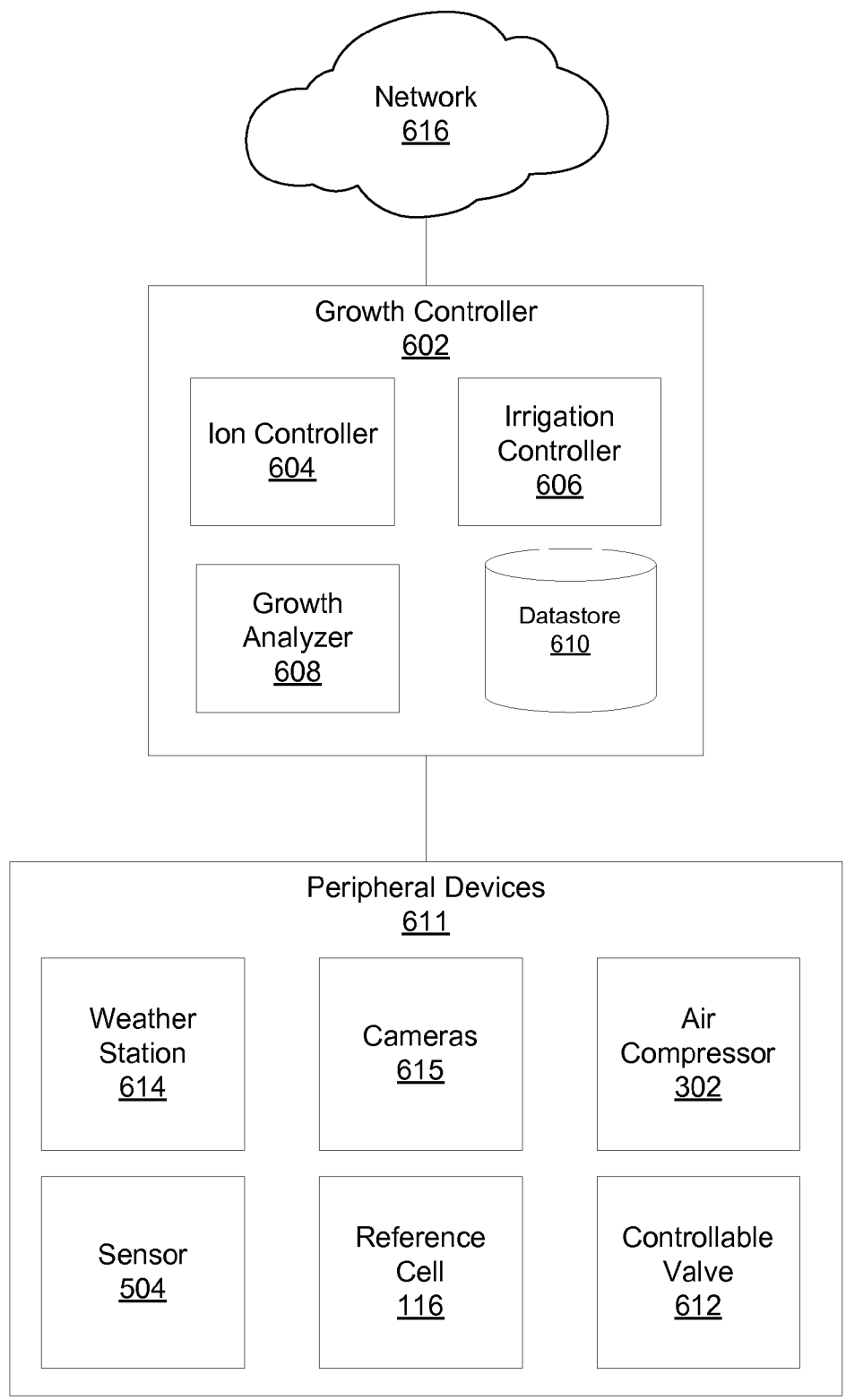
FIG. 6 is a schematic block diagram illustrating one embodiment of a growth controller 602 in accordance with embodiments of the present invention.

FIG. 6 is a schematic block diagram illustrating one embodiment of a growth controller 602 in accordance with embodiments of the present disclosure. The growth controller 602 is configured to monitor, manage, and control ion liquid production and irrigation control. The growth controller 602, in one embodiment, includes an ion controller 604, an irrigation controller 606, a growth analyzer 608, and a datastore 610. The growth controller 602 is configured to communicate with a number of peripheral devices 611 including, but not limited to, the air compressor 302, reference cell 116, controllable valves 612, sensors 504, a weather station 614, cameras 615, etc. The growth controller 602 is also configured to communicate over a network 616 with other devices which may include other growth controllers 602. The growth controller 602 is also configured to receive commands over the network 616 and execute the commands by communicating with the peripheral devices 611.

The ion controller 604 is configured to manage the production of the ion liquid in the ion generation chamber. The ion controller 604 manages the inflow of water and/or acid, and/or alkaline base into the ion generation chamber and also indicates to the air compressor 302 a schedule and pressure for pushing air into the metal plates. The ion controller 604 is also configured to control the controllable valves 612 for managing the ingress and egress of liquid and gas into and out of the ion generation chamber.

Additionally, the ion controller 604 manages the controllable valves 612 between the collection chamber and the fertigation tank. When the ion controller 604 detects that the fertigation tank is full, the ion controller 604 is configured to cease production of the ion liquid. In one embodiment, ceasing production comprises turning off the air compressor 302, or forced air system such as an air injection system, and pumping out any liquid in the ion generation chamber into the collection chamber.

The irrigation controller 606 monitors the trees 102 via the sensors and reference cells 116 to determine when to open valves and deliver liquid from the fertigation tank to the trees. The reference cells 116 or solenoids control the liquid and subsequently the charge of electrons delivered to the soil. A reference cell or several reference cells are located at the base of selected trees or plants to control the level of conductivity or electron flow at the receiving end, in the soils. The charged solution is delivered precisely to the soil at predetermined locations around the trees to change the soil conductivity (measured in ohms) and to slow down the release of gases (Oxygen, Nitrogen, Hydrogen and Carbon) used as soil conditioners and nutrients as such. The system also measures and adjusts for soil pH, salinity in the soil, and the anion:cation "balance" ratios of the soil.

The irrigation controller 606 controls the conductivity in the drip zone around a tree (the area 3 to 5 feet around a tree trunk) by irrigating with the ionic liquid. Additionally, the irrigation controller 606 may control the conductivity in a large are such as a field, yard, etc., by monitoring the reference cells and/or sensors. Adding the liquid to the drip zone increases the conductivity of the soil around the plant, which in turn drives nutrients into the roots of the plant as a result of the electric field. The irrigation controller 606 opens and closes reference cells and controllable valves 612 based on conductivity or current in the effluent from the ion generation chamber and collection chamber. The reference cells 116 have a specified range of low conductivity such as 70 ohms to 100 ohms, for example. Above and below this range the irrigation controller 606 commands the reference cells to close. In the case where the conductivity exceeds the upper limits required to treat soils, the irrigation controller 606 is configured to deliver fresh water (non-ionic liquid) and may or may not contain a wetting agent, to dilute the conductivity of the charged effluent.

The growth analyzer 608 is configured to monitor the growth of plants or trees to determine an optimum soil conductivity for a particular plant or tree. Different species of plants and trees grow optimally at different conductivities. The growth analyzer 608 monitors conductivity and growth rates of the trees or plants, via cameras 615, and records the data in the datastore 610. The datastore 610 is a data repository which may store data in the form of a relational database, or simply in a log.

Figure 7:
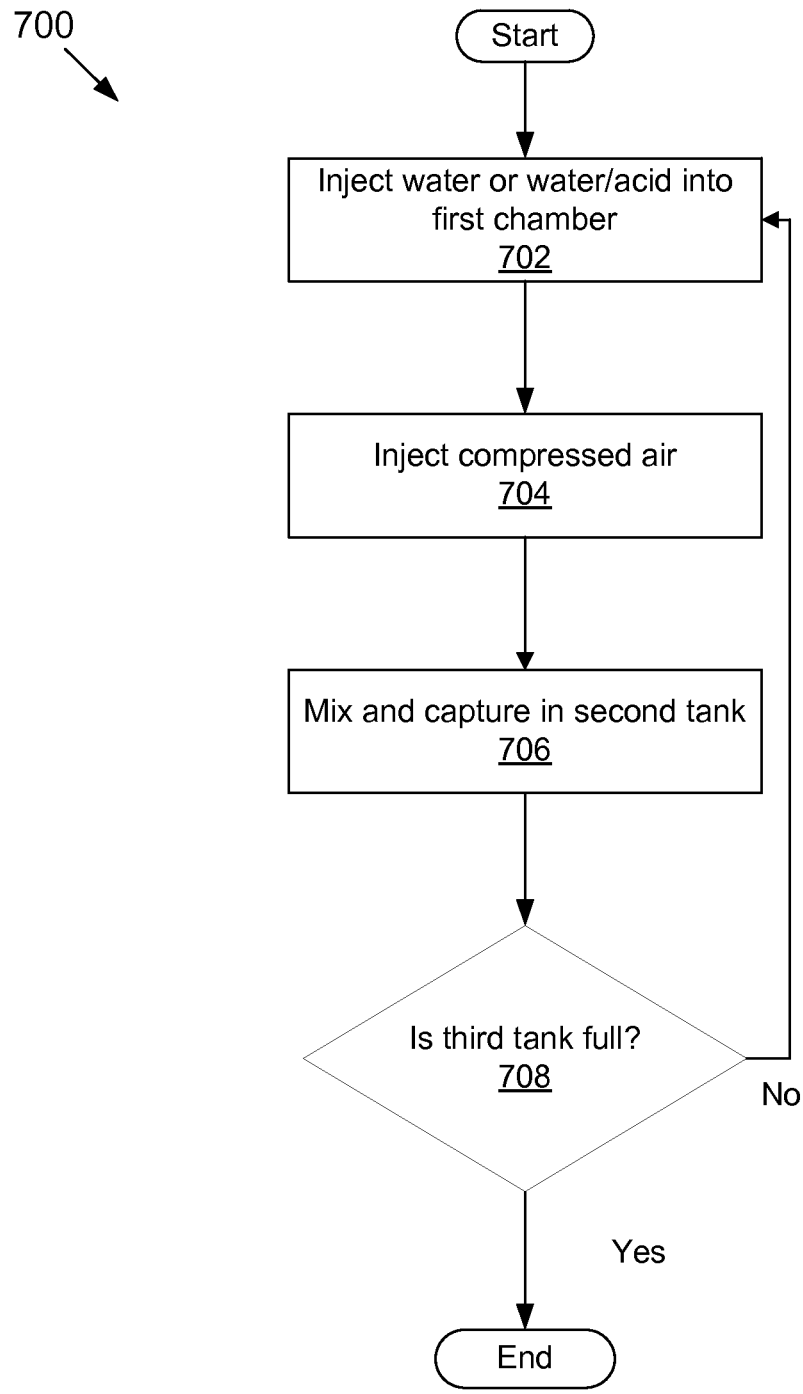
FIG. 7 is a flow diagram of one embodiment of a method of producing an ionic liquid in accordance with one embodiment of the present invention.

FIG. 7 is a flow diagram of one embodiment of a method 700 of producing an ionic liquid in accordance with one embodiment of the present disclosure. The method 700 is performed by processing logic that may comprise hardware (circuitry, dedicated logic, etc.), software (such as is run on a general-purpose computing system or a dedicated machine), or a combination of both. In one embodiment, the growth controller 602 performs the method 700.

Referring to FIG. 7, the processing logic begins the method 700 by injecting, at block 702, a liquid into the first chamber. The first chamber may be the ion generation chamber. The liquid may be water, or a water/acid mixture. The acid may be, in one embodiment, phosphoric or citric acid, or any other desired acid. The processing logic then, at block 704, injects compressed air into the first chamber. The processing logic injects air into a region just below the metal plates. The air may travel in channels formed by grooves in the metal plates. Alternatively, the air may travel in between the metal plates, which are positioned in close proximity to each other.

The processing logic, at block 706 mixes the liquid and ions and captures the ions in a second tank. In one example, the second tank is the collection chamber. The processing logic may direct liquid and gas from the first chamber to the second chamber via pumps and passageways. The processing logic induces a pressure gradient to mix the liquid and cause nitrogen and hydrogen gases to form NH2 or NH3. In one embodiment, the mixing, capturing, and storing of charged solution are performed in a single tank, as will be described below.

If the processing logic, at block 708, determines that a third storage tank is full, the processing logic ceases production of the ion liquid, and the method 700 ends. Otherwise, the processing logic repeats the above described steps.

Figure 8:
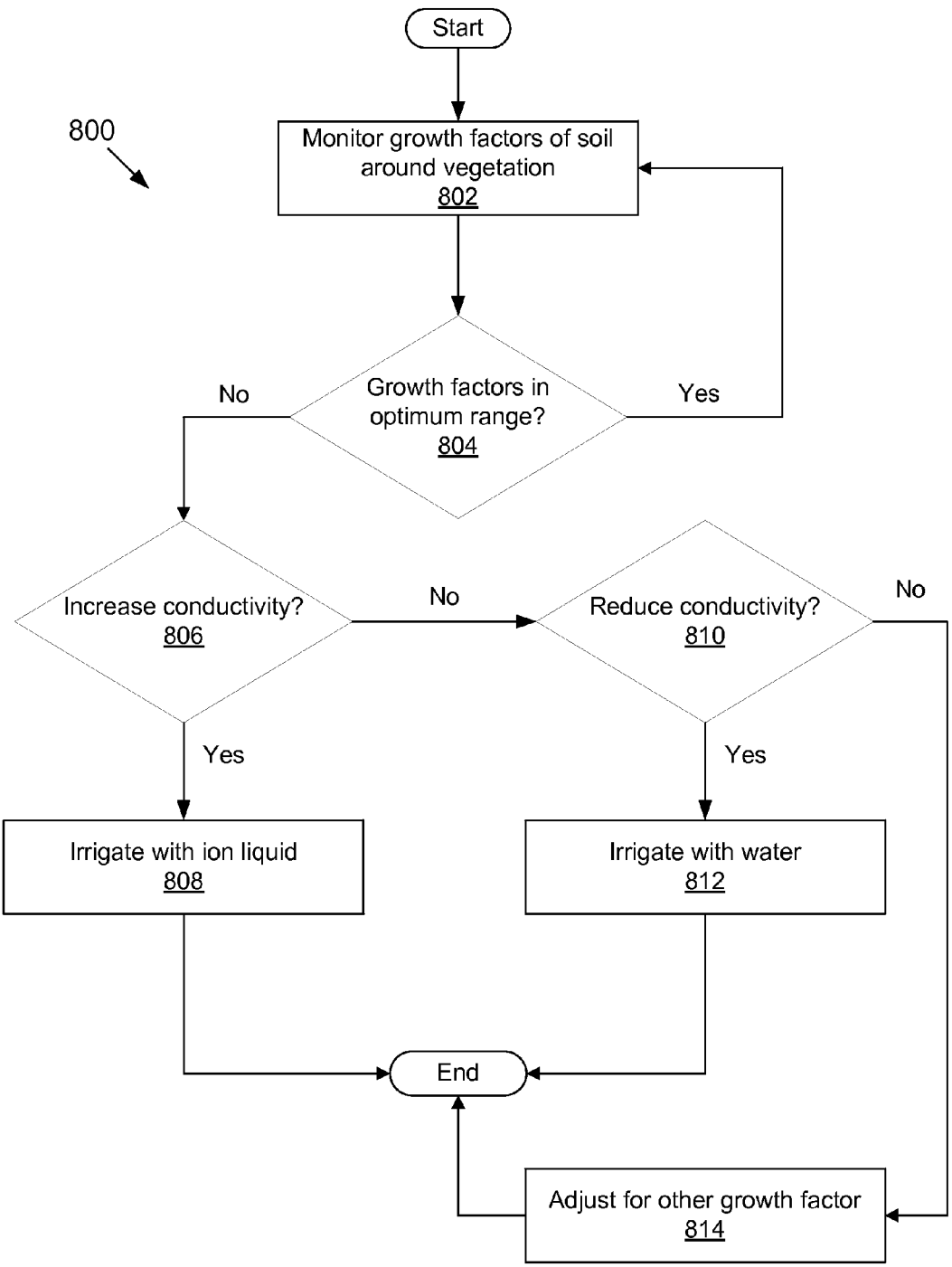
FIG. 8 is a flow diagram of one embodiment of a method of monitoring vegetation growth in accordance with one embodiment of the present invention.

FIG. 8 is a flow diagram of one embodiment of a method 800 of monitoring vegetation growth in accordance with one embodiment of the present disclosure. The method 800 is performed by processing logic that may comprise hardware (circuitry, dedicated logic, etc.), software (such as is run on a general-purpose computing system or a dedicated machine), or a combination of both. In one embodiment, the growth controller 602 performs the method 800.

Referring to FIG. 8, the processing logic begins the method 800 by monitoring, at block 802, growth factors of the soil around vegetation. In one embodiment, the growth factors include, but are not limited to, soil conductivity, soil pH, nitrogen content in the soil, oxygen content in the soil, etc. The processing logic monitors the soil conditions by polling and/or receiving growth data from sensors positioned around the vegetation, as discussed above.

If, at block 804, the processing logic determines that the growth factors are not in an optimum range, the processing logic begins to determine which factor is not in the optimum range. Conversely, if the growth factors are in the optimum range, the processing logic continues monitoring, at block 802.

At decision block 806, the processing logic determines if the soil conductivity is in an optimum range. The optimum range depends on the type of vegetation being grown, and can be determined by analyzing, as described above, or can be a value received from a user. If the processing logic determines that soil conductivity should be increased, the processing logic at block 808 controls the reference cells and valves to irrigate the vegetation with the charged solution until the soil conductivity is in range.

At decision block 806, however, if the processing logic determines that the soil conductivity is too high and the conductivity should be reduced at block 810, the processing logic, at block 812, irrigates the trees or plants with water that has not been processed through the ion generation chamber.

If, at decision block 810, the processing logic determines that the conductivity should not be reduced, then the processing logic at block 814, adjusts for other growth factors that might not be in the optimum range, if any. For example, if the pH is too high or too low, the processing logic is configured to inject an additive into the ion generation chamber, such as an acid, or an alkaline base, etc. If nitrogen or hydrogen content is too high or too low, the processing logic is configured to make adjustments accordingly. The method 800 then ends.

Figure 9:
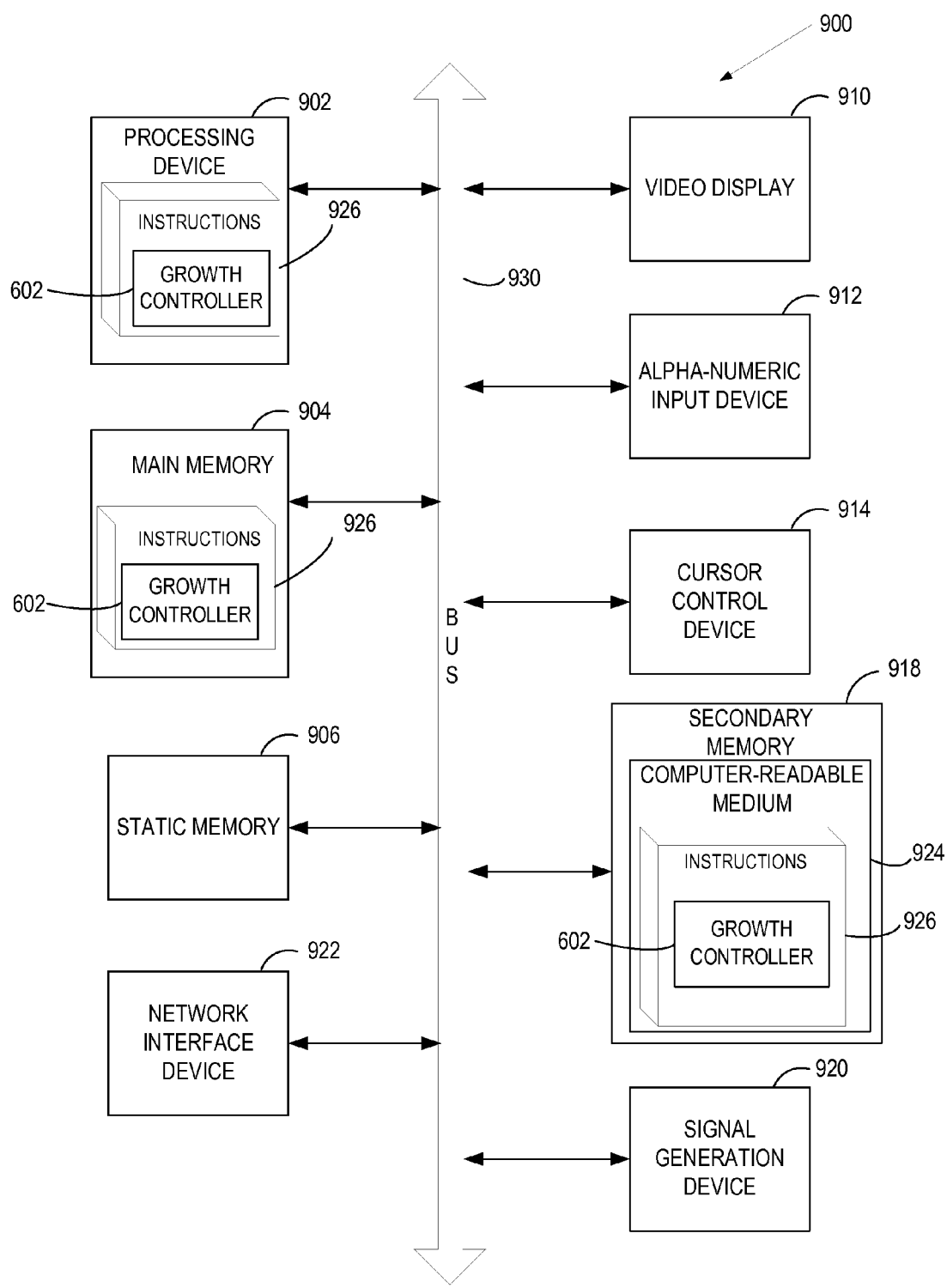
FIG. 9 illustrates a diagrammatic representation of a machine in the exemplary form of a computing system within which a set of instructions, for causing the machine to perform any one or more of the methodologies discussed herein, may be executed.

FIG. 9 illustrates a diagrammatic representation of a machine in the exemplary form of a computing system 900 within which a set of instructions, for causing the machine to perform any one or more of the methodologies discussed herein, may be executed. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a secondary memory 918 (e.g., a data storage device in the form of a drive unit, which may include fixed or removable computer-readable storage medium), which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 918 may include a machine-readable storage medium (or more specifically a computer-readable storage medium) 924 on which is stored one or more sets of instructions 926 embodying any one or more of the methodologies or functions described herein. In one embodiment, the instructions 926 include instructions for the growth controller 602 as described herein. The instructions 926 may also reside, completely or at least partially, within the main memory 904 and/or within the processing device 902 during execution thereof by the computer system 900, the main memory 904 and the processing device 902 also constituting machine-readable storage media.

The computer-readable storage medium 924 may also be used to store the instructions 926 persistently. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 926, components and other features described herein can be implemented as discrete hardware components or integrated in the functionality of hardware components such as ASICS, FPGAs, DSPs or similar devices. In addition, the instructions 926 can be implemented as firmware or functional circuitry within hardware devices. Further, the instructions 926 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "generating," "providing," "selecting," "obtaining," "receiving," "determining," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

Figure 10:
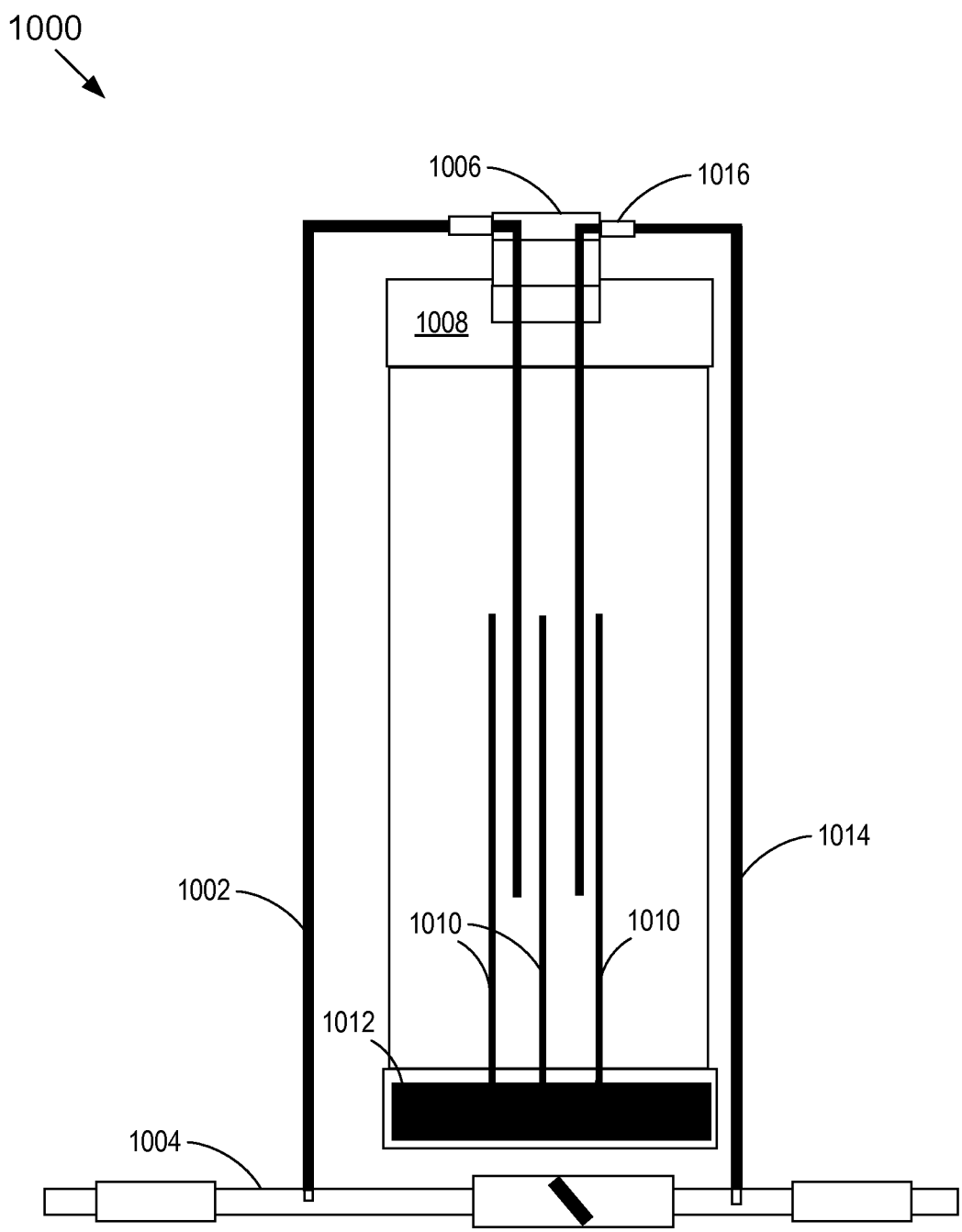
FIG. 10 is a schematic block diagram illustrating one embodiment of a pressurized ionization chamber in accordance with embodiments of the invention.

FIG. 10 is a schematic block diagram illustrating one embodiment of a pressurized ionization chamber 1000 in accordance with embodiments of the invention. As described above, the ion generation tank, collection chamber, and fertigation tank may be formed as a single tank, the ionization chamber 1000. The ionization chamber 1000 functions in a manner substantially equivalent to that described above with reference to FIGS. 1-4. The features and functions of the above described tanks apply equally here.

The ionization chamber 1000 may be formed, in one embodiment, of a length of PVC tubing. Alternatively, the ionization chamber 1000 may be formed of other chemically inert materials, including, but not limited to, ceramic materials, plastic materials, teflon or other materials. The ionization chamber 1000, in one example, has a diameter of about 10 inches, and a height in the range of between about 34 to 38 inches. The ionization chamber 1000 functions using fluid dynamics based on water differentials, vacuum, and hydrogen gas pressure. This system and tank sizes, in one embodiment, are scalable. Smaller version of this technology are contemplated, for example, a 20" to 34" height tank which is 10" in diameter.

An input line 1002 fluidly couples the ionization chamber 1000 with an irrigation line 1004 (or other water supply line). The input line 1002 may be a ¼" or ⅜" siphon line utilizing threaded fittings and a threaded coupling to a siphon cap 1006. The siphon cap 1006, in one embodiment, may be threaded into a cap 1008 with a rubber seal to create vacuum and pressure. The input line 1002 extends into the ionization chamber 1000 to a position adjacent the metal plates 1010. The metal plates 1010 function in a manner similar to the metal plates 202 described above. In other words, the metal plates 1010 generate ions which are then captured in the polymer aggregate 1012.

The metal plates 1010, as depicted, extend upward from the bottom of the ionization chamber 1000, and may have a width in the range of between about 2 and 9 inches, and a height in the range of between about 10 and 30 inches. These dimensions are based on the dimensions of the ionization chamber 1000. For example, if the diameter of the PVC chamber is about 10", then a width of the metal plate 1010 is smaller than the PVC chamber. In one example, the metal plates are alternating dissimilar metals, including but not limited to copper and one of manganese, steel, etc. Pairs of dissimilar metals may be touching, or alternatively separated by a distance in the range of between about 0.1 and 3 inches.

The charged solution exits the ionization chamber 1000 via an output line 1014 or tube. The output tube 1014 couples with the siphon cap 1006. Injector fittings 1016 connect the input and output lines 1002, 1014 to the siphon cap and act to pull water in from the supply line 1004 and dispense the treated charged solution back into the supply line. The ionization chamber 1000 functions without pumps, in one embodiment, because of the water pressure differential between the input and output lines 1002, 1014, and because of a release of hydrogen pressure buildup in the tank that is a result of the dissimilar metals corroding.

Figure 11:
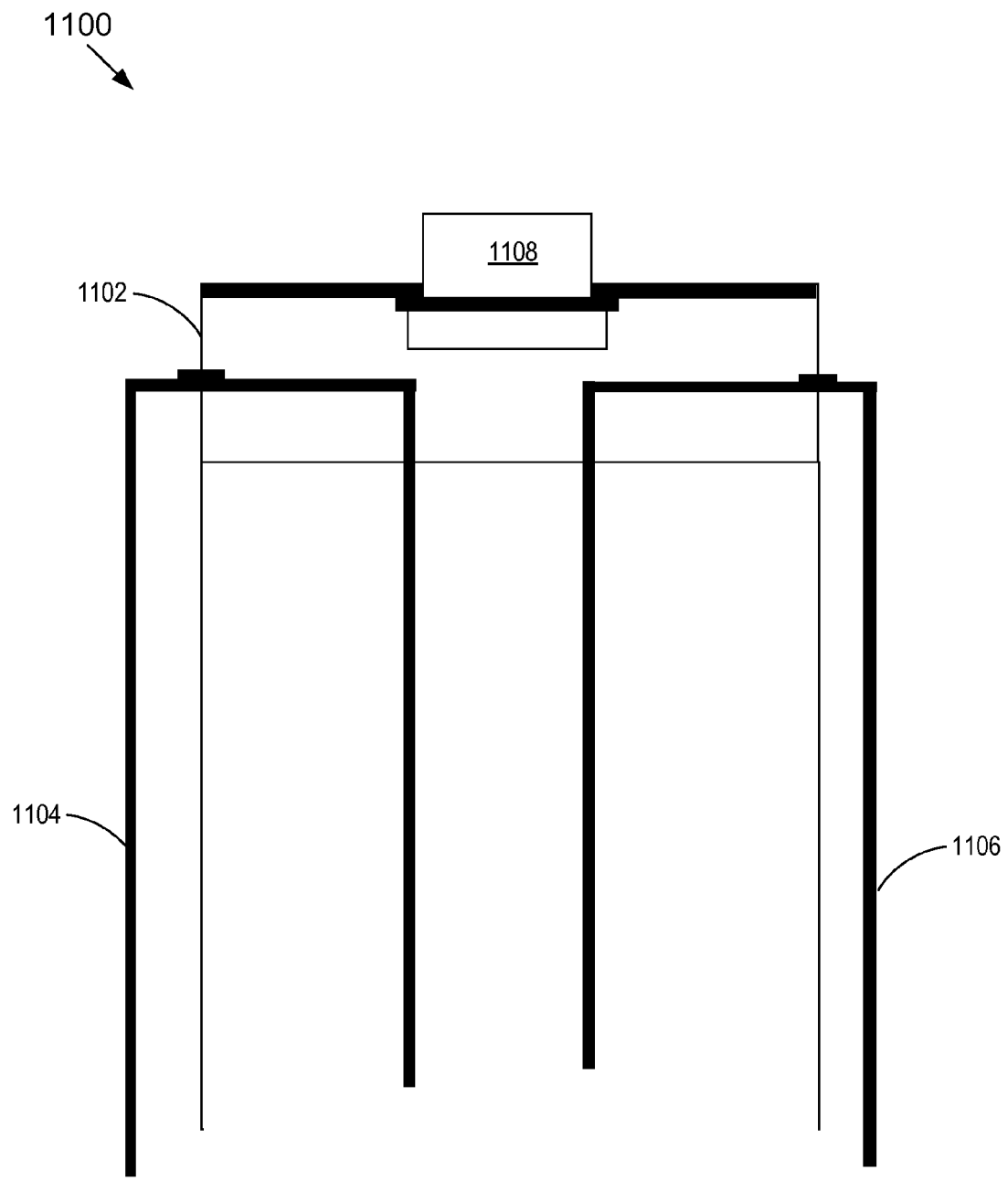
FIG. 11 is a schematic block diagram illustrating another embodiment of an ionization chamber in accordance with embodiments of the invention.

FIG. 11 is a schematic block diagram illustrating another embodiment of an ionization chamber 1100 in accordance with embodiments of the invention. The ionization chamber 1100 may be configured in a manner similar to the ionization chamber of FIG. 10, but with the input and output lines 1104, 1106 coupling with the ionization chamber end cap 1102 instead of a siphon cap. Beneficially, this allows for the easy addition of water or chemicals through a cap 1108. For example, other chemicals or additives that are not generated in-situ by the metal plates may be added through the cap 1108.

Figure 12A:
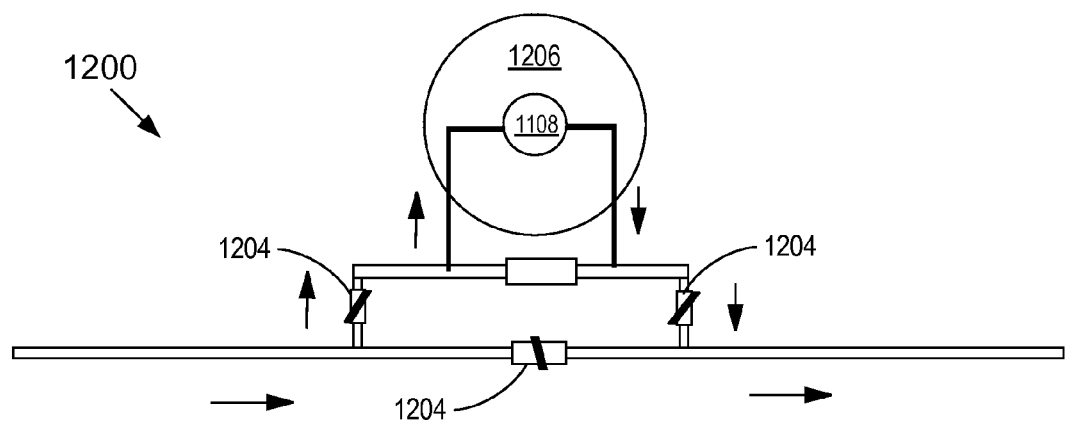
FIGS. 12a and 12b are block diagrams illustrating different embodiments of connecting a water supply line to ionization chambers in accordance with embodiments of the invention.
Figure 12B:
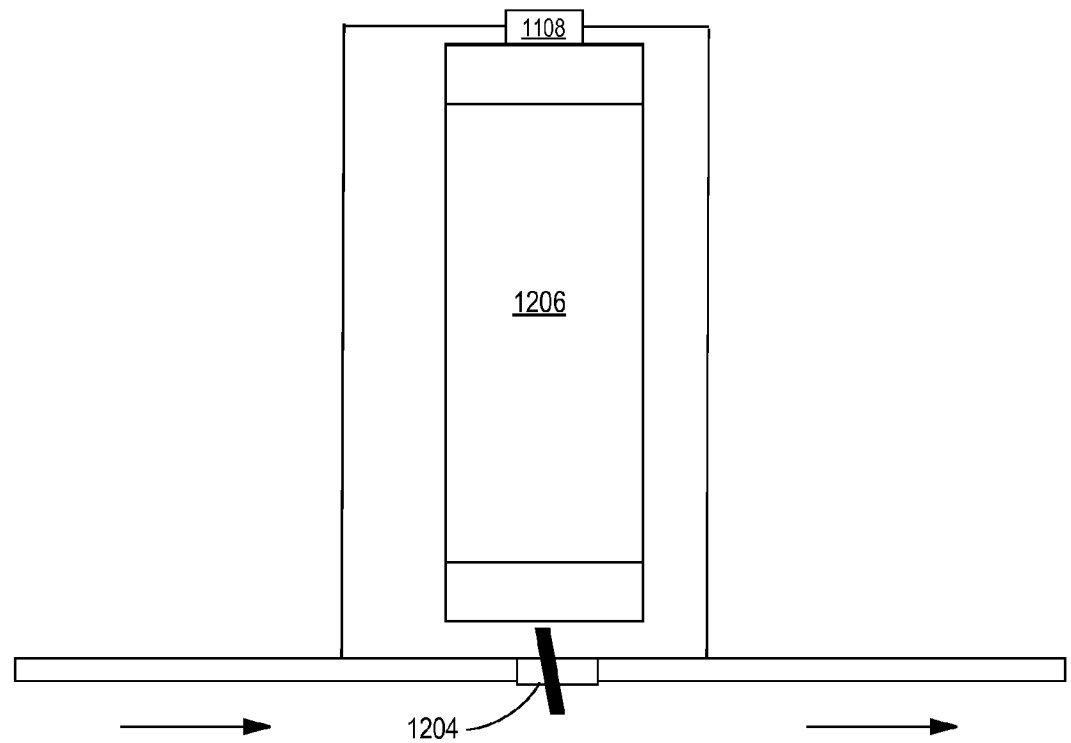

FIGS. 12a and 12b are block diagrams illustrating different embodiments of connecting a water supply line to ionization chambers in accordance with embodiments of the invention. The water supply lines 1202 may be configured with valves 1204 for controlling the flow of water to the ionization chambers 1206. In FIG. 12a, a water bypass 1208 allows for water to bypass the ionization chamber 1206. The valves 1204 may be manually operated or controlled automatically by a controller (see FIG. 6). In the depicted embodiment, the arrows generally indicate the flow of water through the irrigation system 1200.

In the embodiment depicted in FIG. 12a, the controller may partially close the valve 1204 in the main line to direct a portion of the flow through the ionization chamber 1206. This may be done according to conductivity measurements taken by the sensors as described above. Stated differently, the controller may control the amount of charged solution by controlling the flow through the valves 1204. Likewise, a portion of the water may flow through the ionization chamber as a result of a partial closure of the valve 1204. Alternatively, the valve 1204 in FIG. 12b may be completely closed or completely open. Either situation may cause water to flow through the ionization chamber 120b (due to a pressure build up, or due to siphoning).

Figure 13A:
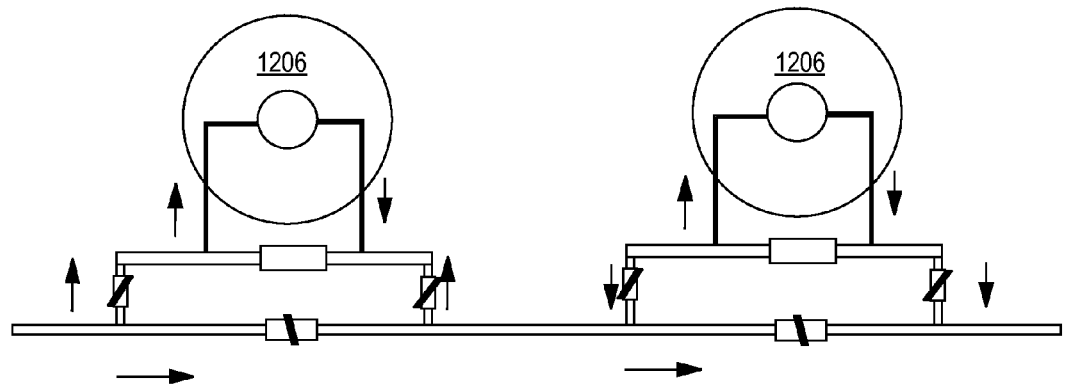
FIGS. 13a and 13b are block diagram illustrating embodiments of the ionization chambers in accordance with embodiments of the invention.
Figure 13B:
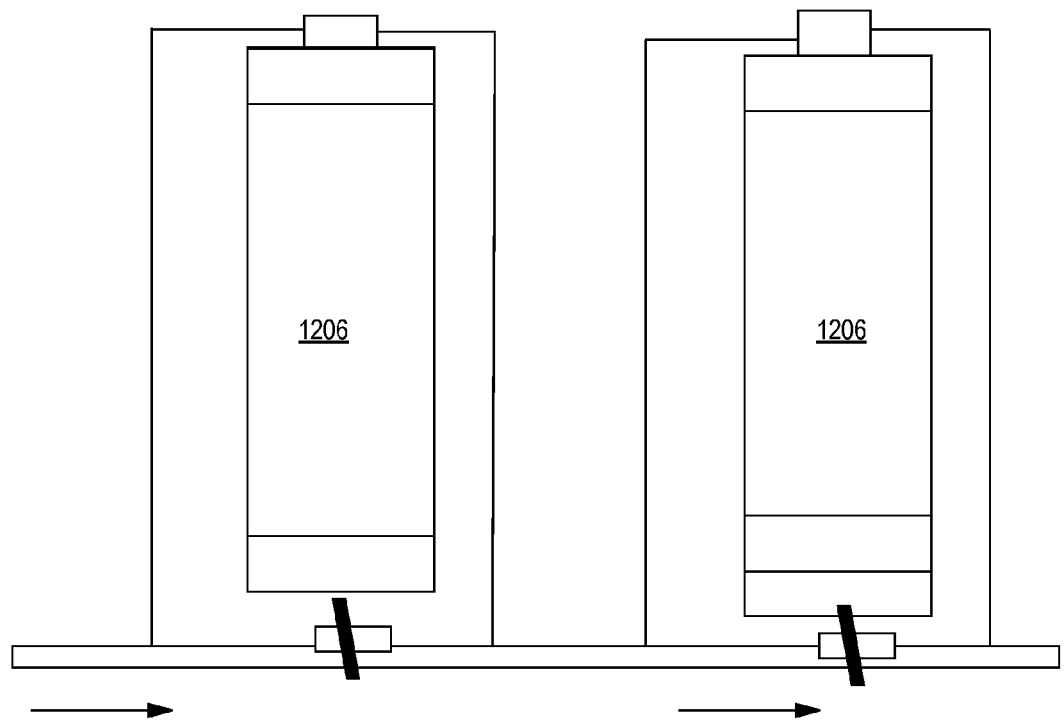

FIGS. 13a and 13b are block diagram illustrating embodiments of the ionization chambers in accordance with embodiments of the invention. As depicted, multiple ionization chambers may be coupled with the water supply line. As many ionization chambers as needed may be coupled to the water supply line depending on the quantity of vegetation that is to be treated. For example only, 10 acres of grass may require more charged solution than a single ionization chamber 1206 is capable of generating. Multiple ionization chambers 1206 may be coupled with or without bypass lines as described above with reference to FIGS. 12a and 12b. Alternatively multiple ionization chambers 1206 on the same water supply line may be coupled differently. In other words, a first ionization chamber may be coupled without a bypass line and a second ionization chamber may be coupled with a bypass line.

In a specific example, different fairways of a golf course were tested using the embodiments of FIGS. 1-13b described above. The charged solution contained ions of iron and manganese, which changed the salt ionization matrix as documented in the SAR (salt absorption ratio) values (cation:anion ratio) in Table 1 below.

TABLE 1

|  | SAR value Sodium absorption ratio | EC Electrical conductivity Mmho/cm | Cation Anion Ratio | Saturated soil Ph |
|---|---|---|---|---|
| Treated turf soil | | | | |
| Fairway 10 | 7.2 | 1.23 | 15.8:12.5 | 7.4 |
| Good soil | | | | |
| (compacted soil) | 9.1 | 1.04 | 14.0:11.6 | 7.3 |
| Poor soil | | | | |
| Untreated turf soil | | | | |
| Fairway 9 | 9.6 | 1.58 | 19.7:16.5 | 7.5 |
| Good soil | | | | |
| (compacted soil) | 13.4 | 1.97 | 24.9:20.9 | 7.9 |
| Poor soil | | | | |

The cation:anion ratio in treated vegetation/soils affects the ability of vegetation to grow and produce chlorophyll. Iron and manganese, as seen in Table 1, help vegetation produce chlorophyll and thereby grow greener.

Table 2 is another specific example of results using the embodiments of FIGS. 1-13b. As recorded, sodium levels of treated soil are 32% and 52% lower than untreated soils. Chloride levels are lower in treated soils. The charged solution generated from the above described ionization chambers (either the singular housings of FIGS. 10-13b, or the separate housings/tanks of FIGS. 1-4) drop the salt ionization index, in one embodiment, from 32% to 52% in treated vegetation/soil. Samples were taken over a three month period in both compacted and uncompacted soils.

TABLE 2

| | Fairway 9 Untreated soils (good soils) * Uncompacted mg/liter | Fairway 9 Untreated soils (poor soils) Compacted mg/liter |
|---|---|---|
| Calcium (ca) | 61 | 59 |
| Magnesium (Mg) | 14.4 | 15.2 |
| Sodium (Na) | 322 | 445 |
| Chloride (Cl) | 123 | 184 |

TABLE 2-continued

| | | |
|---|---|---|
| Sulfur (S) | 59 | 97 |
| Potassium (K) | 22 | 30 |

| | Fairway 10 Treated soils (good soils) * Uncompacted mg/liter | Fairway 10 Treated soils (poor soils) Compacted mg/liter |
|---|---|---|
| Calcium (ca) | 61 | 35 |
| Magnesium (Mg) | 11.8 | 8.5 |
| Sodium (Na) | 235 | 232 |
| Chloride (Cl) | 63 | 69 |
| Sulfur (S) | 32 | 40 |
| Potassium (K) | 28 | 28 |

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
   an ion generation region comprising at least one pair of dissimilar metal plates, the ion generation region configured to receive a liquid and route the liquid past the dissimilar metal plates to capture ions between the dissimilar metal plates and absorb the ions in the liquid to form a charged solution;
   a collection region comprising layers of collection beds for storing the charged solution, the layers of collection beds housed within a single chamber and configured to capture nitrogen, oxygen, or hydrogen in an ionic form;
   a first passageway and second passageway, the first passageway connecting the ion generation region and the collection region and configured to pass the charged solution from the ion generation region to the collection region; wherein the second passageway is configured to be a gas passageway and connecting to a top of the ion generation region at a level above a water level and fluidly connecting to a bottom of the collection region and configured to pass gas not absorbed into the charged solution in the ion generation region to the collection region; and
   a fertigation region configured to disperse the charged solution outside the apparatus.

2. The apparatus of claim 1, wherein the at least one pair of dissimilar metal plates comprises a first metal plate formed of a copper composition and a second metal plate formed of a composition of at least one of manganese, iron, zinc, aluminum, or lithium, wherein the at least one pair of dissimilar metal plates are in direct contact.

3. The apparatus of claim 1, wherein the at least one pair of dissimilar metal plates further comprise channels formed in surfaces of the at least one pair of dissimilar metal plates.

4. The apparatus of claim 1, wherein at least one collection bed further comprises a polymer-based material for capturing ions.

5. The apparatus of claim 1, wherein the ion generation region, the collection region, and the fertigation region are housed within a single housing.

6. The apparatus of claim 1, wherein the ion generation region, the collection region, and the fertigation region are each housed by separate housings.

7. A method performed by a computing device comprising:
   monitoring growth factors of soil around vegetation;
   determining if the growth factors are within a predetermined range of growth factors;
   receiving a measurement of a conductivity of the soil and determining if the measurement is within a range of acceptable conductivities; and
   adjusting the conductivity of the soil in response to the measurement being outside the range of acceptable conductivities via a controller coupled with an ion generation system, the ion generation system comprising:
      an ion generation region comprising at least one pair of dissimilar metal plates, the ion generation region configured to receive a liquid and route the liquid past the at least one pair of dissimilar metal plates to capture ions between the at least one pair of dissimilar metal plates and absorb the ions in the liquid to form a charged solution,
      a collection region comprising layers of collection beds for storing the charged solution, the layers of collection beds housed within a single chamber and configured to capture nitrogen, oxygen, or hydrogen in an ionic form;
      a first passageway and second passageway, the first passageway connecting the ion generation region and the collection region and configured to pass the charged solution from the ion generation region to the collection region; wherein the second passageway is configured to be a gas passageway and connecting to a top of the ion generation region at a level above a water level and fluidly connecting to a bottom of the collection region and configured to pass gas not absorbed into the charged solution in the ion generation region to the collection region, and
      a fertigation region configured to disperse the charged solution outside the system.

8. The method of claim 7, wherein the at least one pair of dissimilar metal plates comprises a first metal plate formed of a copper composition and a second metal plate formed of a composition of at least one of manganese, iron, zinc, aluminum, or lithium, wherein the at least one pair of dissimilar metal plates are not in direct contact.

9. The method of claim 7, wherein the at least one pair of dissimilar metal plates are in direct contact, and wherein each of the at least one pair of dissimilar metal plates further comprise a channel formed in a surface of each of the at least one pair of dissimilar metal plates, and wherein the channels of each of the at least one pair of dissimilar metal plates line up.

10. The method of claim 7, wherein at least one collection bed further comprises a polymer-based material for capturing ions.

11. The method of claim 7, wherein the ion generation region, the collection region, and the fertigation region are housed within a single housing.

12. The method of claim 7, wherein the ion generation region, the collection region, and the fertigation region are each housed by separate housings.

13. A system comprising at least one computing device and at least one program module that are together configured for performing actions comprising:

monitoring growth factors of soil around vegetation;

determining if the growth factors are within a predetermined range of growth factors;

receiving a measurement of a conductivity of the soil and determining if the measurement is within a range of acceptable conductivities; and adjusting the conductivity of the soil in response to the measurement being outside the range of acceptable conductivities via a controller coupled with an ion generation system, the ion generation system comprising:

an ion generation region comprising at least one pair of dissimilar metal plates, the ion generation region configured to receive a liquid and route the liquid past the at least one pair of dissimilar metal plates to capture ions between the at least one pair of dissimilar metal plates and absorb the ions in the liquid to form a charged solution, a collection region comprising layers of collection beds for storing the charged solution, the layers of collection beds housed within a single chamber and configured to capture nitrogen, oxygen, or hydrogen in an ionic form;

a first passageway and second passageway, the first passageway connecting the ion generation region and the collection region and configured to pass the charged solution from the ion generation region to the collection region; wherein the second passageway is configured to be a gas passageway and connecting to a top of the ion generation region at a level above a water level and fluidly connecting to a bottom of the collection region and configured to pass gas not absorbed into the charged solution in the ion generation region to the collection region, and a fertigation region configured to disperse the charged solution outside the system.

14. The system of claim 13, wherein the at least one pair of dissimilar metal plates comprises a first metal plate formed of a copper composition and a second metal plate formed of a composition of at least one of manganese, iron, zinc, aluminum, or lithium, and wherein the at least one pair of dissimilar plates are fused together.

15. The system of claim 13, wherein at least one collection bed further comprises a polymer-based material for capturing ions.

16. The system of claim 13, wherein the ion generation region, the collection region, and the fertigation region are housed within a single housing.

17. The system of claim 13, wherein the at least one pair of dissimilar metal plates further comprise channels formed in surfaces of the at least one pair of dissimilar metal plates.

18. The system of claim 13, wherein the at least one pair of dissimilar metal plates are mesh plates.

* * * * *